(12) United States Patent
Gillis et al.

(10) Patent No.: US 6,407,880 B1
(45) Date of Patent: Jun. 18, 2002

(54) ENVIRONMENTAL CORROSION PROTECTION FOR HARD DISK DRIVE ELEMENTS BY THERMAL ACTIVATION

(75) Inventors: Donald R. Gillis, San Jose; Kris Schouterden, Los Gatos; Ullal Vasant Nayak, San Jose; Reinhard F. Wolter, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,780

(22) Filed: Mar. 28, 2000

(51) Int. Cl.[7] ............................................... G11B 17/02
(52) U.S. Cl. ................................................... 360/97.02
(58) Field of Search .......................... 360/97.02, 97.03, 360/97.01, 128

(56) References Cited

U.S. PATENT DOCUMENTS 5,075,807 A * 12/1991 Inoue et al. ............. 360/97.02
5,229,899 A * 7/1993 Brown et al. ............ 360/97.03
5,447,695 A * 9/1995 Brown et al. ............ 360/97.02
6,296,691 B1 * 10/2001 Gidumal .................. 360/97.02

* cited by examiner

*Primary Examiner*—Robert S. Tupper
(74) *Attorney, Agent, or Firm*—Robert B. Martin; Bracewell & Patterson, L.L.P.

(57) ABSTRACT

A computer system hard disk drive contains magnetic heads for reading data to and writing data from storage media disks. The heads are coupled to an electrical source that thermally excites the heads during non-operation of the disk drive in order to raise the temperature of the heads. The temperature increase induces a mechanism such as a local, low humidity barrier at each of the heads. When the disk drive is stored in harsh environmental atmospheres, such as high temperatures and high humidity, the mechanism or low humidity barrier is sufficient to overcome the ambient conditions and reduce environmental corrosion of the heads.

26 Claims, 2 Drawing Sheets

ENVIRONMENTAL CORROSION PROTECTION FOR HARD DISK DRIVE ELEMENTS BY THERMAL ACTIVATION

BACKGROUND OF THE INVENTION

1. Technical Field

This invention relates in general to corrosion protection and in particular to protecting computer hard disk drive components from environmental corrosion during storage and shipment. Still more particularly, the invention relates to environmental corrosion protection for hard disk drive components, such as magnetic read/write heads, by electrothermally activating the heads to raise their temperature above the ambient temperature.

2. Description of the Prior Art

Generally, a digital data access and storage system for a computer system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or more platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

During storage and shipment, some computer systems are exposed to extreme environmental conditions such as high temperatures and high humidity. Under such conditions, the exposed computer components tend to corrode at an accelerated rate compared to components that are stored under normal conditions where the environmental surroundings are substantially maintained at comfortable or ideal levels. Consequently, extended exposure to harsh atmospheres will ultimately hasten the failure of the components. The small magnetic read/write heads in hard disk drives are particularly susceptible to accelerated failure when stored in extreme conditions.

SUMMARY OF THE INVENTION

A computer system hard disk drive contains magnetic heads for reading data to and writing data from storage media disks. The heads are coupled to an electrical source that thermally excites the heads during non-operation of the disk drive in order to raise the temperature of the heads. The temperature increase induces a mechanism such as a local, low humidity barrier at each of the heads. When the disk drive is stored in harsh environmental atmospheres, such as high temperatures and high humidity, the mechanism or low humidity barrier is sufficient to overcome the ambient conditions and reduce environmental corrosion of the heads.

Thus, it is an object of the invention is to provide improved corrosion protection.

Another object of the invention is to protect computer hard disk drive components from environmental corrosion during storage and shipment.

Still another object of the invention is to provide environmental corrosion protection for hard disk drive components, such as magnetic read/write heads, by thermally activating the heads in order to raise their temperature above the ambient temperature.

Additional objects and advantages of the invention will become apparent in light of the description which follows.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
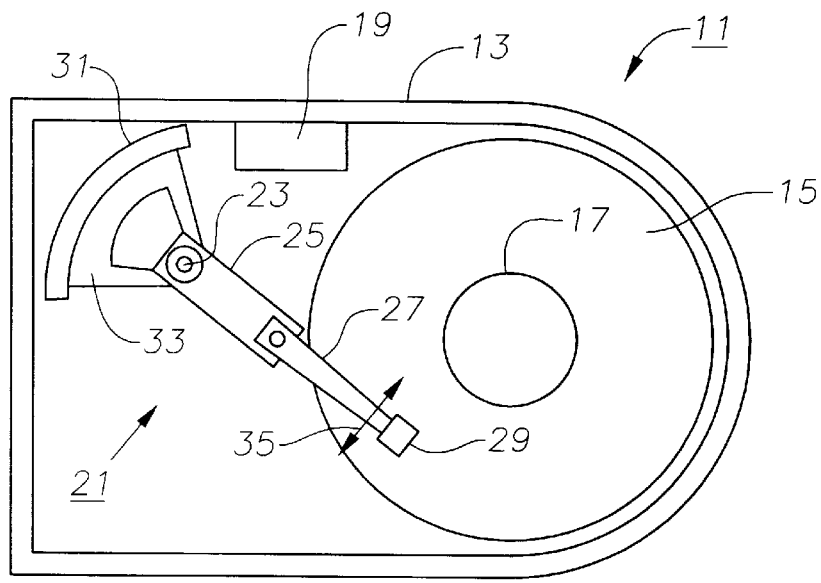
FIG. 1 is a schematic drawing of a hard disk drive file.

Referring to FIG. 1, a schematic drawing of an information storage system comprising a magnetic hard disk file or drive 11 for a computer system is shown. Drive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head gimbal assembly 29 with an air bearing slider having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Figure 2:
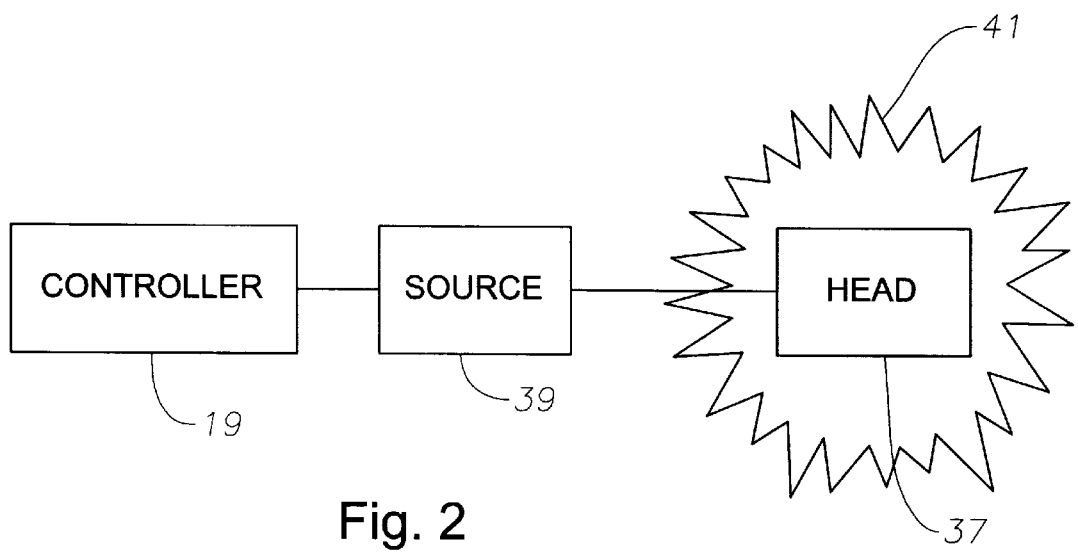
FIG. 2 is a schematic drawing of a portion of the file of FIG. 1.

Referring now to FIG. 2, a simplified schematic drawing of a circuit portion of drive 11 depicting head 37 on arm 21. Head 37 is coupled to an electrical source or heating circuit 39 located within drive 11. Like the other components of drive 11, heating circuit 39 is controlled by controller 19, and preferably located within the slider or assembly 29. In addition, the temperature of head 37 may be elevated selectively by other means as well, such as a heating coil, magnetic induction, or still other means such as those commonly known in the art. During non-operation of the drive 11, a current or voltage is suitably supplied to the heating circuit 39 by a battery to thermally heat the slider. In a preferred embodiment, the heating circuit 39 includes one or more write elements or read elements of the head. Alternatively, the heating circuit includes a heating coil or magnetically inductive element. The heating circuit is activated manually or automatically during non-operation of drive 11 to provide current or voltage bias to heat the slider. Suitable heating circuits will be known to those skilled in the art.

The bias across head 37 increases the temperature locally around the sensor. Note that the bias across head 37 may be applied on a continuous basis, or pulsed in an intermittent fashion. The temperature increase induces a corrosive-inhibiting mechanism that effectively reduces corrosion of head 37. For example, the temperature increase may create a local, lower relative humidity barrier, envelope, or zone 41 at head 37 as compared to the ambient atmospheric conditions. The low humidity envelope 41 surrounding head 37 is sufficient to reduce corrosion under some environmental conditions. Other mechanisms also may be employed for accomplishing the same objective.

Figure 3:
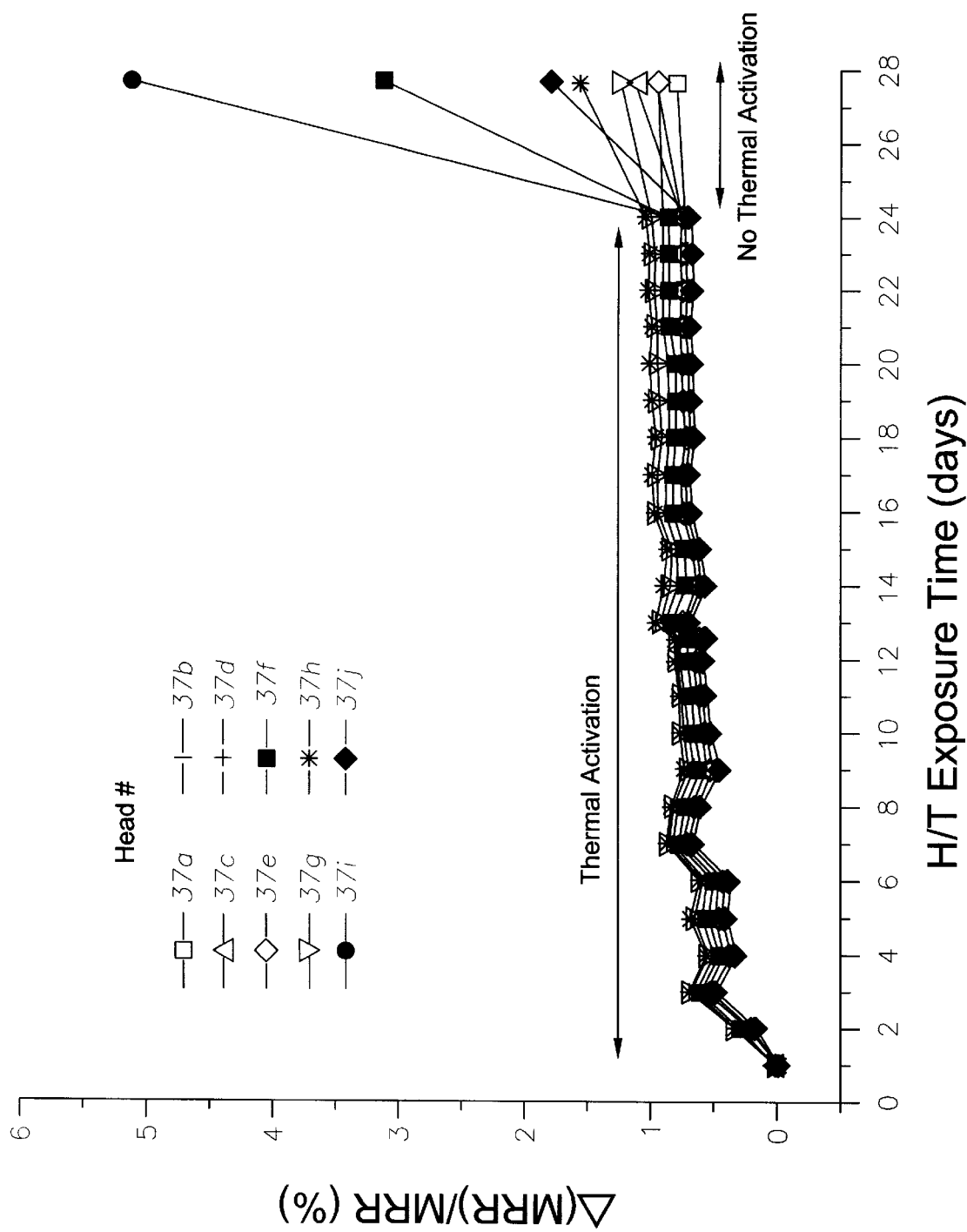
FIG. 3 is a plot of the change in magnetic head resistance over time for various heads in the file of FIGS. 1 and 2.

The following environmental corrosion experiment demonstrates the beneficial influence of thermally exciting heads 37. In this experiment, a shut off disk drive 11 containing ten heads 37 was stored in a temperature/humidity chamber and exposed to a controlled atmosphere for 28 days. The heads 37 were prepared in a stressed condition and the atmosphere was maintained at a temperature of 50° C. and 90% relative humidity (RH). During the first 24 days of the experiment, the heads 37 were constantly thermally activated through resistive heating resulting from a continuous bias current therethrough. As illustrated in FIG. 3, the change in head resistance (MRR) of each of the heads 37 through the first 24 days is very small and no appreciable environmental corrosion took place. The elevated temperature and relatively lower humidity of the barrier 41 around heads 37 created by the thermal activation previously described, actively protected heads 37 from corroding under these harsh environmental conditions. Barrier 41 prevents the more humid ambient atmosphere from corrosively attacking the components.

However, during the following four days of the experiment the thermal activation of heads 37 was removed. Thus, during days 25–28, the heads 37 were completely exposed to the 50° C., 90% RH environment without their additional corrosion protection. After day 24, the MRR for heads 37$f$, 37$h$, 37$i$, and 37$j$ increased significantly. These changes were consistent with expected corrosion effects. The heads 37 were subject to normal environmental corrosion when they were not actively protected by the thermal activation of the present invention.

The present invention has several advantages. Thermal activation of components protects the components from the corrosive effects of some harsh environmental conditions. By elevating the temperature of the components, the barrier prevents the more humid ambient atmosphere from corrosively attacking the components.

While the invention has been shown or described in only some of its forms, it should be apparent to those skilled in the art that it is not so limited, but is susceptible to various changes without departing from the scope of the invention.

What is claimed is:

1. A hard disk drive assembly in an ambient atmosphere having an ambient relative humidity and an ambient temperature, comprising in combination:

a base;

a disk mounted to the base and selectively rotatable relative thereto;

an actuator having an arm which includes an air bearing slider with a head for reading data from and writing data to a surface of the disk, the actuator being pivotally mounted to the base for positioning the arm and the head at selected radial positions relative to the disk; and a heating circuit that heats the head during non-operation of the disk drive to elevate a non-operational temperature of the head above the ambient temperature in order to inhibit the ambient atmosphere from corrosively attacking the head.

2. The hard disk drive assembly of claim 1 wherein a protective barrier having a relative humidity that is lower than the ambient relative humidity is created around the head; and wherein the barrier actively protects the head from exposure to the ambient atmosphere such that environmental corrosion of the head is reduced.

3. The hard disk drive assembly of claim 1 wherein a voltage is applied across the head to heat the head.

4. The hard disk drive assembly of claim 1 wherein a current is applied to the head to heat the head.

5. The hard disk drive assembly of claim 1 wherein the heating circuit is operable with battery power.

6. The hard disk drive assembly of claim 1 wherein the head is heated intermittently.

7. The hard disk drive assembly of claim 1 wherein the head is heated on a continuous basis.

8. The hard disk drive assembly of claim 1 wherein the heating circuit includes a read or write element of the head.

9. A hard disk drive assembly in an ambient atmosphere having an ambient relative humidity and an ambient temperature, comprising in combination:

a base;

a plurality of disks mounted to the base and selectively rotatable relative thereto, each of the disks having opposed surfaces;

an actuator having a plurality of arms, each of the arms having at least one head for reading data from or writing data to surfaces of respective ones of the disks, the actuator being pivotally mounted to the base for positioning the arms and the heads at selected radial positions relative to the disks; and an electrical source coupled to the heads that thermally activates the heads through resistive heating, wherein a non-operational temperature of the heads is selectively elevated above the ambient temperature such that the ambient atmosphere is prevented from corrosively attacking the head.

10. The hard disk drive assembly of claim 9 wherein a protective barrier having a relative humidity that is lower than the ambient relative humidity is created locally around each of the heads; and wherein the barriers actively protect the heads from exposure to the ambient atmosphere such that environmental corrosion of the heads is reduced.

11. The hard disk drive assembly of claim 9 wherein the electrical source is a voltage source that applies a voltage across each of the heads.

12. The hard disk drive assembly of claim 9 wherein the electrical source is a current source that supplies a current through each of the heads.

13. The hard disk drive assembly of claim 9 wherein the temperature of the head is elevated intermittently.

14. The hard disk drive assembly of claim 9 wherein the temperature of the head is elevated on a continuous basis.

15. A hard disk drive assembly in an ambient atmosphere having an ambient relative humidity and an ambient temperature, comprising in combination:

a base;

a plurality of disks mounted to the base and selectively rotatable relative thereto, each of the disks having opposed surfaces;

an actuator having a plurality of arms, each of the arms having at least one head for reading data from or writing data to surfaces of respective ones of the disks, the actuator being pivotally mounted to the base for positioning the arms and the heads at selected radial positions relative to the disks;

an electrical source coupled to the heads that thermally activates the heads through resistive heating, wherein a temperature of the heads during non-operation of the disk drive is selectively elevated above the ambient temperature such that a protective barrier having a relative humidity that is lower than the ambient relative humidity is created locally around each of the heads; and wherein the barriers actively protect the heads from exposure to the ambient atmosphere such that environmental corrosion of the heads is reduced.

16. The hard disk drive assembly of claim 15 wherein the electrical source is a voltage source that applies a voltage across each of the heads.

17. The hard disk drive assembly of claim 15 wherein the electrical source is a current source that supplies a current through each of the heads.

18. The hard disk drive assembly of claim 15 wherein the barriers are generated intermittently.

19. The hard disk drive assembly of claim 15 wherein the barriers are generated on a continuous basis.

20. A method for reducing environmental corrosion of a read/write head in a disk drive assembly during non-operational activity in an ambient atmosphere having an ambient relative humidity and an ambient temperature, comprising the steps of:

(a) elevating a temperature of the head above the ambient temperature after read/write operations of the disk drive assembly have-been terminated;

(b) inducing a mechanism at the head in response to step (a); and (c) preventing the head from being exposed to the ambient atmosphere with the mechanism such that environmental corrosion of the head is reduced.

21. The method of claim 20 wherein step (a) comprises applying a voltage across the head in order to resistively heat the head.

22. The method of claim 20 wherein step (a) comprises supplying a current through the head to resistively heat the head.

23. The method of claim 20 wherein step (a) comprises magnetically inducing an increase in the temperature of the head.

24. The method of claim 20 wherein step (a) comprises intermittently elevating the temperature of the head.

25. The method of claim 20 wherein step (a) comprises elevating the temperature of the head on a continuous basis.

26. The method of claim 20 wherein step (b) comprises forming a barrier at the head that has a relative humidity that is lower than the ambient relative humidity.

* * * * *